June 14, 1966  H. C. SWIFT  3,255,849
PARKING BRAKE

Filed April 20, 1964  2 Sheets-Sheet 1

INVENTOR.
Harvey C. Swift.
BY
Carness, Dickey & Pierce
ATTORNEYS.

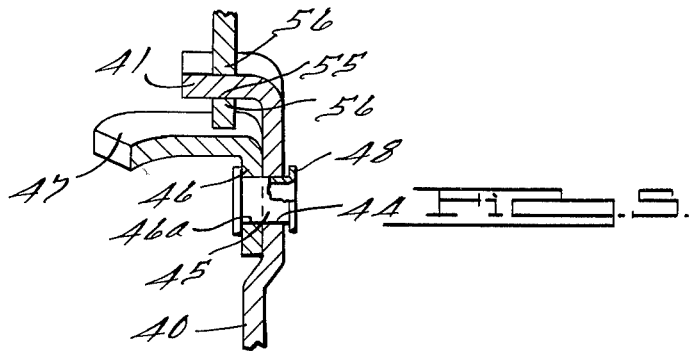
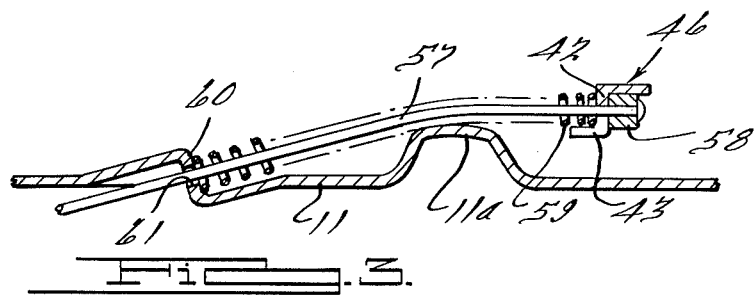
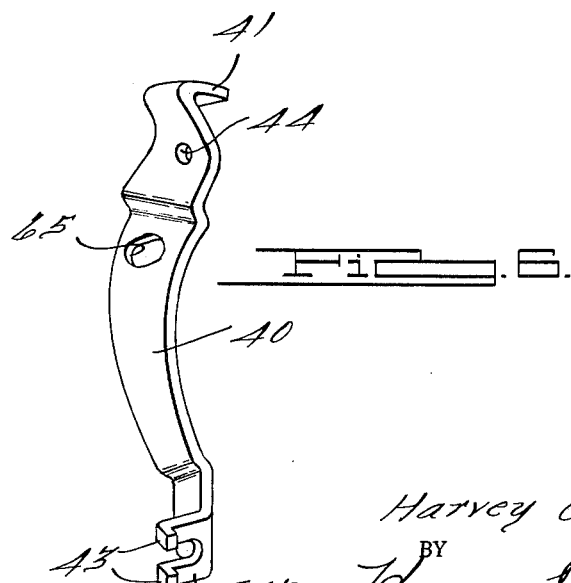

United States Patent Office 3,255,849
Patented June 14, 1966

3,255,849
PARKING BRAKE
Harvey C. Swift, Birmingham, Mich., assignor to Kelsey-Hayes Company, Romulus, Mich., a corporation of Delaware
Filed Apr. 20, 1964, Ser. No. 361,190
3 Claims. (Cl. 188—78)

This invention relates to brakes and, more particularly, to improvements in the so-called emergency or parking brake which is usually mechanically operated.

One of the objects of this invention is to provide a parking brake actuating mechanism which approaches the ultimate in structural simplicity and thus may be manufactured, assembled, and serviced at a very nominal cost.

Another object of this invention is to provide a parking brake actuating mechanism including an operating lever and a strut connecting said lever to the opposite brake shoe, wherein said lever and strut are pivotally interconnected prior to assembly with the brake, whereby these parts comprise a unit which may be stocked as a single part for service requirements; may be assembled as a unit with the brake structure; and which otherwise lends itself to easy and efficient manufacturing and handling processes.

Another object is to provide a mechanical operating mechanism for parking brakes for association with brakes of the web-ledge type wherein the backing plate is provided with ledges and other protuberances and wherein the operating mechanism is designed so as to avoid such projections and is operable without interference therewith.

The various objects and advantages, and the novel details of construction of one commercially practical embodiment of the invention, will become more apparent as this description proceeds, especially when considered in connection with the accompanying drawings, in which:

FIGURE 3 is a fragmentary sectional view taken substantially on the plane indicated by line 3—3 in FIGURE 1;

FIGURE 4 is a detail sectional view taken on line 4—4 in FIGURE 1;

FIGURE 5 is a detail sectional view taken substantially on the plane indicated by line 5—5 in FIGURE 1; and FIGURE 6 is a perspective view of the brake operating lever.

Figure 1:
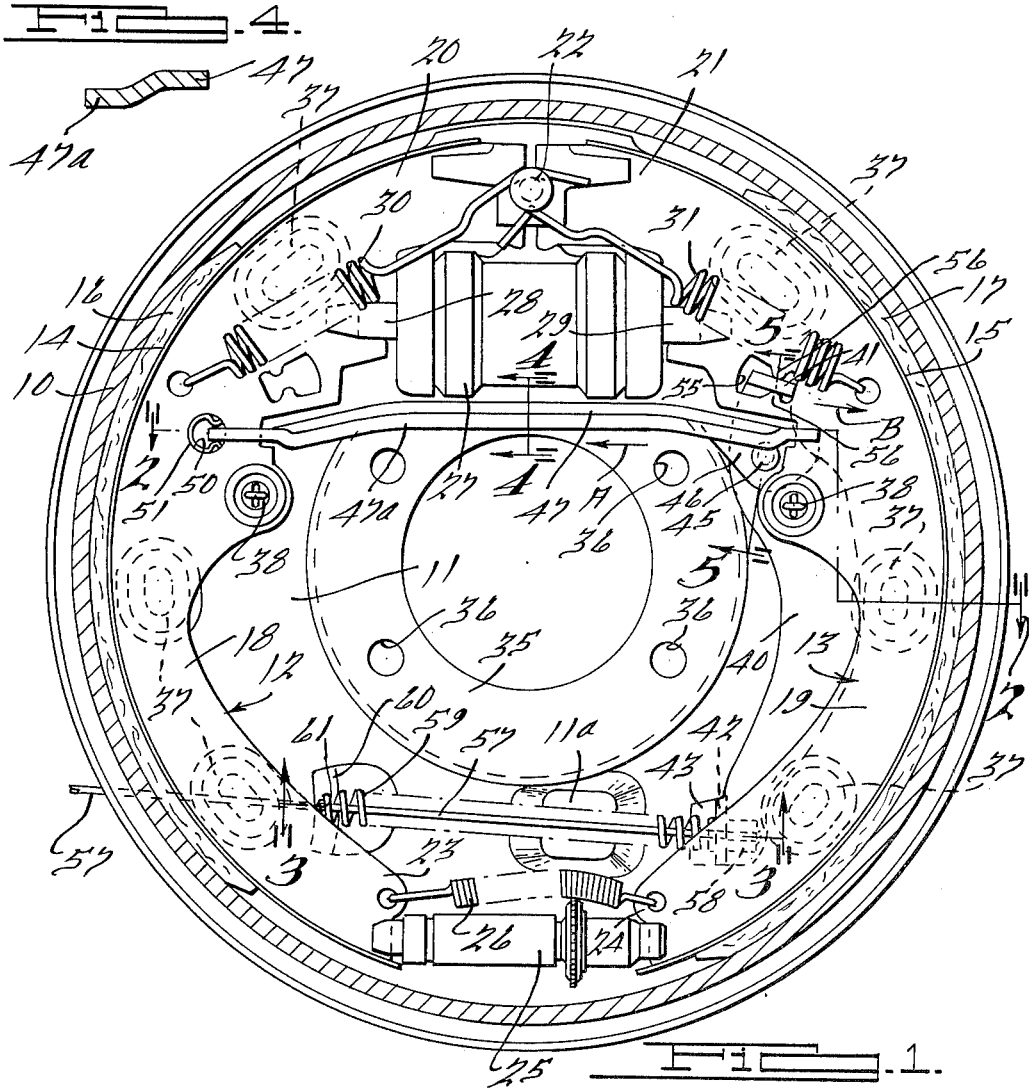
FIGURE 1 is a sectional elevational view of a brake assembly showing the device of this invention incorporated therein.

The illustrative embodiment of the invention is shown as applied to a conventional brake structure of the internal expanding type comprising arcuate brake shoes adapted to cooperate with the inner surfaces of the brake drum. In FIGURE 1, the reference character 10 indicates a brake drum which is mounted on the wheel hub of a vehicle (not shown) for rotation therewith. A stationary backing plate 11 is mounted on a stationary part (not shown) of the vehicle.

The basic elements of a conventional hydraulic brake structure comprise a pair of brake shoes 12 and 13 in the form of arcuate segments, said brake shoes being provided with arcuate rim portions 14 and 15 supporting lining elements 16 and 17, respectively. The rim portions 14 and 15 are reinforced against flexure by web portions 18 and 19 extending perpendicularly from the rim portions 14 and 15.

In conventional brakes of this type, the ends 20 and 21 of the brake shoes 12 and 13 engage an anchor pin 22 fixed to the backing plate 11. The opposite ends 23 and 24 of the brake shoes 12 and 13 engage an adjustable or extensible strut 25, the shoe ends 23 and 24 being retained in engagement with the adjustable strut 25 by means of a tension spring 26.

A hydraulic wheel cylinder 27 having plunger members 28 and 29 extending from opposite ends thereof into engagement with the brake shoe webs 18 and 19 provides the actuating device for automatically moving the brake shoes 12 and 13 into engagement with the brake drum 10. The plunger members 28 and 29 extend from piston members (not shown) within the wheel cylinder 27, hydraulic fluid being directed into the wheel cylinder between the piston members from a conventional pedal operated master cylinder (not shown). Retraction springs 30 and 31 normally move the ends 20 and 21 of the brake shoes into engagement with the anchor pin 22 when hydraulic pressure is released from the wheel cylinder 27.

The brake construction thus far described constitutes the essential elements of a conventional hydraulically operated brake and forms no part of the present invention. The present invention relates to an emergency or parking brake which consists of mechanically operated means for applying the brake shoes 12 and 13 to the brake drum 10, independently of the hydraulically operated brake mechanism. By means of the present invention there is provided a brake actuating lever and strut which are pivotally interconnected and may be handled and installed as a unit. The construction of these members is such that they may be quickly and easily assembled with a web-ledge type of brake. Web-ledge type brakes are provided with a center mounting portion for securing the brake on a axle housing and with ledges and other protuberances formed on the backing plate. The operating mechanism of this invention is designed so as to avoid such projections and is operable without interference therewith.

In the so-called web-ledge type of brakes, the backing plate 11 is provided with a central embossment or annular portion 35 which is provided with apertures 36 by means of which the brake is attached to or mounted on an axle housing (not shown). The backing plate is usually also provided with a plurality, here shown as six, of projecting ledges or protuberances 37, against which the webs 18 and 19 of the brake engage so that the brake shoes are slidably supported on these ledges rather than on the surface of the backing plate itself. One of these ledges or protuberances is shown in section in FIGURE 2.

The reference character 38 indicates the usual spring holddown devices which are provided for holding the brake shoes against the ledges 37.

In accordance with the present invention, there is provided a brake actuating lever 40 shown in plan view in FIGURE 1 and in perspective in FIGURE 6. The brake operating lever 40 is provided at one end with a substantially laterally extending projection 41 and at its other end with an oppositely extending slotted flange 42 terminating in right angularly extending fingers or ears 43. The laterally extending projection 41 provides means for fulcruming the lever 40 on one of the brake shoes and the projecting end portion 42-43 provides means for connecting the end of a force supplying member, such as a cable, to the end of the lever 40, which features are yet to be described.

The reference character 44 indicates an aperture in the lever 40 adapted to receive a rivet 45 by means of which the flanged end 46 of a strut member 47 is permanently pivotally secured to the lever 40. As shown best in FIGURE 5, the rivet 45 extends through an opening 46a in the flange 46 of the strut 47 and through the opening 44 in the lever to permanently pivotally connect the actuating lever 40 and the strut 47 together. As shown best in FIGURES 1 and 4, one edge 47a of the strut 47 is offset slightly from the general transverse plane of the strut to add stiffness to the strut. The rivet 45 may be of the hollow type which, after assembly with the parts, is upset to provide a head 48 which is preferably spaced slightly from the adjacent face of the lever 40 so that there is sufficient clearance between the lever 40 and strut 47 to permit relative rotation of these parts about the pivot 45.

Figure 2:
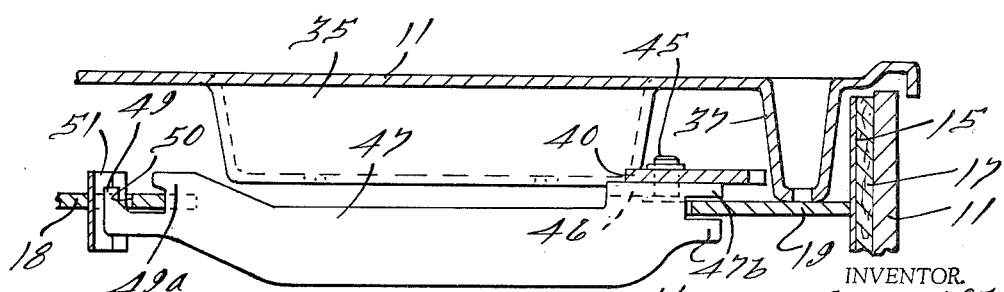
FIGURE 2 is a sectional elevational view taken substantially on the plane indicated by line 2—2 in FIGURE 1.

The free end of the strut 47, see particularly FIGURES 1 and 2, is provided with a hook-shaped end portion 49 adapted to engage an aperture 50 in the web 18 of the other brake shoe 12. The other leg 49a of the hook-shaped portion 49 engages the adjacent edge of the brake shoe web 18. Interposed between the opening or aperture 50 in the brake shoe web 18 and the hook-shaped end 49 is a spring clip 51 which engages the wall of the aperture 50 and embraces the hook-shaped end of the strut 47 to hold the same against relative movement with respect to the brake shoe web which might cause a rattling noise. The other end of the strut 47 is bifurcated as at 47b to embrace the web 19 of the other brake shoe 13.

The brake actuating lever 40 is associated with the brake shoe 13 by inserting the laterally extending projection 41 through an aperture 55 formed in the web 19 of the brake shoe 13 (see particularly FIGURE 1). As shown, the aperture 55 may be wider than the projection 41 so that the projection 41 may partake of limited relative sidewise movement within the aperture 55. The top and bottom sides of this aperture 55, as viewed in FIGURE 1, are provided with a pair of opposed nibs, nubs, or prongs 56 which engage the top and bottom surfaces of the projection 41 to provide point or line contacts therewith and to properly position the projection 41 with respect to the aperture 55.

At the lower end of the actuating lever 40, the forked extension 42–43 is adapted to receive the end of the force applying member in the form of a cable 57 provided at its free end with a head 58 which engages the flange 42. It is customary to provide a spring 59 surrounding the cable 57 having one end engaging the opposite side of the flange 42 and the other end engaging a shoulder 60 formed on the backing plate 11 adjacent the aperture 61 through which the cable emerges from the inside of the brake to the outside thereof. In brakes of this type, the backing plate 11 is provided with a protuberance 11a which supports the cable and spring intermediate their length. This particular structure forms no part of the present invention, but shows one means for moving the lever 40 to actuate the brake shoes 12 and 13.

In assemblying the herein described mechanical means for actuating the brake shoes, it will be remembered that the actuating lever 40 and strut 47 are permanently pivotally connected as at 45 so that the lever and strut constitute a single unit which may be assembled as such. In assemblying this unit with the remaining brake structure, the projecting end 41 is projected through the aperture 55 in the brake shoe web 19, in the manner shown in FIGURE 1, and the hook-shaped end 49 of the strut 47 is engaged with the aperture 50 in the brake shoe web 18 in engagement with the spring clip 51 which is disposed in the aperture. The end of the cable 57 is then engaged with the lower end of the lever 40 and the device is ready for operation.

When the force applying member or cable 57 is pulled, the lever 40 will be rocked about its fulcrum, which is provided by the pivotal engagement of the nibs or nubs 56 with the projection 41. This movement of the lever 40 will move the strut 47 in the direction of arrow A, FIGURE 1, so as to apply the brake shoe 12 to the brake drum. The reaction of the lever 40 to this movement will move the projection 41 in the direction of arrow B, FIGURE 1, so that the projection 41 will engage the end of the aperture 55 in the brake shoe web 19 and move the brake shoe 13 into engagement with the brake drum. When the pull on the cable 57 is released, the springs 30 and 31 will return the brake shoes 12 and 13 and the lever 40 and strut 47 to their normal positions illustrated in FIGURE 1.

As previously mentioned, the reference character 38 indicates a conventional spring type holddown device for the brake shoe and, in order that this holddown device may pass through the actuating lever 40 without affecting its movement, the actuating lever 40 is provided with an enlarged opening 65 so that the lever 40 may be actuated without touching the holddown device 38.

As shown in FIGURES 1 and 6, the actuating lever 40 is shaped to avoid the ledges 37 and the central embossment 35 so that the same is operable without interference therewith.

As pointed out hereinbefore, the lever 40 and strut 47 are permanently pivotally connected so as to comprise a unit which may be stocked as a single part, may be assembled as a unit with the brake structure, and otherwise lends itself to easy and efficient manufacturing and handling processes. The construction of the parts is such that the lever-strut unit 40–47 may be quickly and easily assembled with the brake structure and the end of the lever 40 may be quickly connected to the end of the operating cable. The construction of the parts approaches the ultimate in structural simplicity and thus may be manufactured, assembled and serviced at a very nominal cost.

While one commercially practical embodiment of the invention has been described and illustrated herein somewhat in detail, it will be understood that various changes may be made as may come within the purview of the accompanying claims.

What is claimed is:

1. In a brake mechanism comprising a pair of brake shoes having webs, and a brake drum, that improvement which comprises, a brake actuating lever, means for loosely fulcruming one end of said lever on the web of one of said brake shoes, a strut member pivotally connected to said lever intermediate its ends and having a hook-shaped free end portion engaging an aperture in the other brake shoe, a spring clip member in said aperture engaging said hook-shaped portion to hold the same against rattling, and a force applying member connected to the other end of said lever to rock the same to actuate said brake shoes.

2. In a brake mechanism comprising a pair of brake shoes having webs, and a brake drum, that improvement which comprises, a brake actuating lever provided with a laterally extending end portion, the web of one of said brake shoes being formed with an aperture into which said end portion is inserted to provide a fulcrum for said lever, a strut having one end pivotally connected to said lever at a point spaced from said end portion, said lever and strut forming a single unit which may be assembled as such with the brake structure, the free end of said strut having a hook-shaped end engageable in an aperture in the web of the other brake shoe, a spring member in said aperture engaging said hook-shaped end to hold the same against rattling the other end of said lever being formed with a slotted laterally extending portion, and a force applying cable detachably connected to said slotted portion to rock said lever to actuate said brake shoes.

3. In a brake mechanism comprising a pair of brake shoes having webs, and a brake drum, that improvement which comprises, a brake actuating lever provided with a laterally extending portion at one end thereof loosely engaging an aperture in the web of one of said brake shoes to form a fulcrum for said lever, a strut pivotally connected at one end to said lever at a point spaced from said laterally extending end portion, the free end of said strut being connected to the web of the other brake shoe, the connection between the free end of said strut and the other brake shoe comprising, an aperture in the web of said brake shoe, a hook-shaped end portion on said strut engageable in said aperture, a spring clip member located in said aperture and engaging said hook-shaped end portion to hold the same against movement that might cause rattling, and a cable connected to the other end of said lever to rock the same to actuate said brake shoes.

References Cited by the Examiner

UNITED STATES PATENTS

| 2,074,725 | 3/1937 | Goepfrich | 188—106 |
| 2,242,790 | 5/1941 | McClenahen | 188—106 X |
| 2,322,061 | 6/1943 | Schnell | 188—106 X |

DUANE A. REGER, *Primary Examiner.*

MILTON BUCHLER, *Examiner.*